United States Patent [19]

Reber et al.

[11] Patent Number: 5,364,207

[45] Date of Patent: Nov. 15, 1994

[54] METHOD FOR MAKING SERVICE CONNECTIONS TO POLYETHYLENE PIPE

[76] Inventors: Cleve C. Reber, P.O. Box 417, Deer Park, Tex. 77536; Kurt S. Myers, 7634 Braesdale, Houston, Tex. 77071

[21] Appl. No.: 38,148

[22] Filed: Mar. 26, 1993

[51] Int. Cl.⁵ .................... F16L 1/028; F16L 55/18
[52] U.S. Cl. .................... 405/303; 405/156; 405/154; 138/97; 285/21
[58] Field of Search ............... 405/154, 156, 184, 303; 138/97; 285/21, 284

[56] References Cited

U.S. PATENT DOCUMENTS

| | | | |
|---|---|---|---|
| 3,907,625 | 9/1975 | Vogelsanger | 285/21 X |
| 4,357,961 | 11/1982 | Chick | 138/97 |
| 4,455,482 | 6/1984 | Grandclement | 285/21 X |
| 4,519,124 | 5/1985 | Burghardt | 405/154 X |
| 4,869,619 | 9/1989 | Akesaka | 405/154 |
| 4,894,521 | 1/1990 | Evans | 285/21 X |
| 5,076,730 | 12/1991 | Bergey | 405/154 |

FOREIGN PATENT DOCUMENTS 275983 11/1989 Japan .................... 405/154

Primary Examiner—Randolph A. Reese
Assistant Examiner—John A. Ricci
Attorney, Agent, or Firm—Kurt S. Myers

[57] ABSTRACT

The present invention is directed to a method for making service connection to polyethylene replacement sewer pipe. Specifically, the method involves the steps of (1) locating the service; (2) excavating an opening less than two feet in diameter from the surface to the polyethylene replacement pipe at the service; (3) introducing a fusing apparatus on top of the polyethylene pipe and fusing a stack to the polyethylene pipe; and (4) drilling a opening into the polyethylene pipe through the fused stack. Before drilling the opening into the polyethylene pipe, the stack may be tested to make certain that there are no leaks in the fusing step and that the stack is securely connected to the polyethylene pipe.

4 Claims, 3 Drawing Sheets

METHOD FOR MAKING SERVICE CONNECTIONS TO POLYETHYLENE PIPE

FIELD OF THE INVENTION

The present invention is directed to a method for making service connections to polyethylene replacement sewer pipe. More specifically, the method is directed to providing service connections to a replacement polyethylene pipe which replaces a broken concrete or tile sewer line and includes fusing a polyethylene service connection to the new polyethylene pipe.

BACKGROUND OF THE INVENTION

Currently there are two basic methods used to repair broken sewer lines made of concrete or tile with polyethylene pipe. One is called slip lining which is pulling a smaller polyethylene pipe through the broken concrete or tile pipe. The other is a method which breaks the concrete or tile pipe and at the same time pulls in a polyethylene pipe. This latter method can maintain the pipe diameter at the same internal diameter with the replacing polyethylene pipe as was present in the broken pipe. These methods are being used by cities and multicipalities to fix the infrastructure of their waste water systems. These projects are carried out on the city or multicipality easements. However, both methods now require that the service connection, i.e. the connections from a house or business (the line or pipe on private property) be carried out usually in a pit which is 5 feet (5') to 12 feet (12') deep. These pits are in the backyards of person's homes and to allow sufficient room for a man to enter the pit, as many as 5 to 8 yards of dirt must be removed and stored. The available connectors for connecting the service connection or line to the new polyethylene pipe are saddles which are held onto the new polyethylene pipe by clamps. The clamps are very similar to the clamps used on hoses in a car but having much greater diameters. To the connectors clamped to the new polyethylene pipe are a variety of polyvinyl-chloride (PVC) pieces which can be connected to the service or private connection or line to complete the service connection.

The problems with the current methods of making the service connections are many and include the need to excavate large amounts of dirt to get to the site of the connection, the pit needs to be shored to meet OSHA standards for working to levels greater than 5 feet deep, the use of saddles and clamps requires that access be obtained completely around the new polyethylene pipe, clamps cannot completely seal the saddle to prevent infusion of water which is passing on the outside of the polyethylene pipe, disposal of the large amount of dirt removed to gain access to the connection site and the chance that the saddle is moved or disturbed during refilling the pit. Any one of these problems can make the service connection a major and costly problem; collectively, these are each overcome by the method of the present invention.

U.S. Pat. No. 4,647,073 discloses a clamping device for connecting a branch pipe to a main pipe buried underground. The clamp is lowered to the main pipe from the surface.

U.S. Pat. No. 4,832,069 discloses a method for tapping water mains by minimal excavation to expose the upper half of the main and then locating (with respect to the main) a conventional pipe tapping device but without employing means encircling the pipe.

U.S. Pat. No. 4,978,255 discloses a method for tapping a ferrous pipe through a saddle adhered to the surface of the pipe by an adhesive, the saddle having a closure member which prevents the adhesive entering the bore.

The patents are all related to methods used either with water or gas utility lines.

SUMMARY OF THE INVENTION

The present invention is directed to a method for making service connection to polyethylene replacement sewer pipe. Specifically, the method involves the steps of (1) locating the service; (2) excavating an opening less than two feet in diameter from the surface to the polyethylene replacement sewer pipe at the service; (3) introducing a fusing apparatus on top of the polyethylene pipe and fusing a stack to the polyethylene pipe; and (4) drilling a opening into the polyethylene pipe through the fused stack. Before drilling the opening into the polyethylene pipe, the stack may be tested to make certain that there are no leaks in the fusing step and that the stack is securely connected to the polyethylene pipe.

BRIEF DESCRIPTION OF THE DRAWINGS

FIG. 1 illustrates the locking and excavating steps;

FIG. 2 illustrates the introduction of the fusing apparatus onto the top of the polyethylene pipe and positioning the stack in preparation for fusing;

FIG. 3 illustrates the fusing apparatus with the heating element raised in a side view in relation to the polyethylene pipe and the stack positioned before fusing;

FIG. 4 illustrates the heating element on top of the polyethylene pipe and the stack on the top surface of the heating element in preparation for fusing;

FIG. 5 illustrates the completion of the fusing of the stack to the polyethylene pipe with the heating element of the fusing apparatus retracted for removal and the testing of the stack to make certain that there are no leaks in the fusing step; and FIG. 6 illustrates the drilling of the opening into the polyethylene pipe through the stack.

BRIEF DESCRIPTION OF THE PREFERRED EMBODIMENTS

Figure 1:
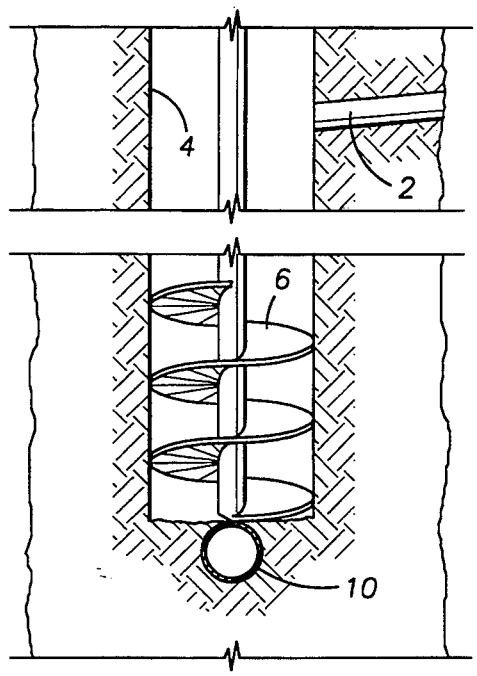
FIG. 1 to FIG. 6 schematically illustrate the steps of the method of the present invention.

The method for making service connection to polyethylene replacement sewer pipe involves the following steps: (1) locating the service; (2) excavating an opening less than two feet in diameter from the surface to the polyethylene replacement pipe at the service; (3) introducing a fusing apparatus on top of the polyethylene pipe and fusing a stack to the polyethylene pipe; and (4) drilling a opening into the polyethylene pipe through the fused stack. The method may further include testing the stack to make certain that there are no leaks in the fusing step between the stack and the polyethylene pipe and that the stack is securely connected to the polyethylene pipe before drilling the opening into the polyethylene pipe. To more particularly point out the details of the fusing step, the sub-steps of step (3) may include (3a) introducing the heating element and supporting structure of the fusing apparatus into the excavation over the polyethylene pipe; (3b) positioning the stack within the supporting structure; (3c) positioning the heating element on the upper surface of the polyethylene pipe and the stack on the upper portion of the heating element to heat the upper surface of the polyethylene pipe and the lower end of the stack; (3d) raising the stack and then the heating element and quickly lowering the stack onto the heated portion of the polyethylene pipe; and applying pressure to the stack until the fusion of the stack to the polyethylene is complete.

Currently the two basic methods used to repair broken sewer lines made of concrete or tile with polyethylene pipe are a method called slip lining which is pulling a smaller polyethylene pipe through the broken concrete or tile pipe or methods which break the concrete or tile pipe and at the same time pull in a polyethylene pipe. These methods replace broken pipe with polyethylene pipe and are carried out on the city or municipality easements either in front of or behind homes and business. In the slip line method, there is no connection to the polyethylene pipe until the old service is broken and a new service connection made. In the methods which break the old sewer pipe, the old service connections are also broken. It is now required by the current methods employed to make the new service connection, i.e. the connections from a house or business (the line or pipe on private property), in a pit which is 5 feet (5') to 12 feet (8') deep. These pits are in the backyards of person's homes and to allow sufficient room for a man to enter the pit to make the connection by hand, as many as 5 to 12 yards of dirt must be removed and stored. The problems of making these new service connections, which are set forth hereinabove, are overcome by the method of the present invention which will be described in detail with reference to the drawings.

Referring now to FIGS. 1 to 6, the method of the present invention is schematically illustrated. A service 2, which was connected to the broken sewer pipe and replaced by a new polyethylene pipe 10, is located. For example, if a block of homes has a sewer line running down an easement behind the houses, the replacement polyethylene pipe 10 will replace the old sewer line to which all the homes on two streets having common back yards were connected. In replacing the old sewer line each line or service from each house will be broken, either to make the connection or by the method used to replace the old sewer pipe. A common way of locating each service is televising the broken sewer line before it is replaced with the polyethylene pipe and recording the distance from the starting point of the television camera to each service. Measuring the distances on the surface from the starting point but above and along the old sewer line will locate the services. If televising is not used, then the sewer line coming from each house is located and followed to the intersection of the old sewer line, usually by digging in the back yard after finding the sewer connection at the house. Since sewer systems are gravity flow, the lines or services coming from each house usually start very shallow and drop to several feet, while the sewer line may be 5 to 12 feet deep depending on the subdivision. The last portion of the pipe from the private property to the sewer line in the easement is usually a vertical drop.

FIG. 1 illustrates the locating of the service 2 and the excavating of an opening 4 less than two feet in diameter above the polyethylene pipe 10. The excavation is preferably done with an auger 6 attached to a power unit, which will be described in detail hereinafter. A preferred diameter for the opening 4 is 18" or 1.5 feet, and if five feet of dirt is removed only a little over one-third ($\frac{1}{3}$) cubic yard of dirt requires storing and if ten feet of dirt is removed less than three quarters ($\frac{3}{4}$) cubic yards need to be handled. In the method of the present invention all operations are carried out from the surface, not requiring anyone to enter the excavation or opening 4. The opening 4 may be directly over the polyethylene pipe 10 or at the 12 o'clock position in relationship to the polyethylene pipe 10 as shown in FIG. 1. However, the opening 4 may be at an angle such that the relationship between the opening 4 and the polyethylene pipe 10 is between the 10 and 2 o'clock positions as shown in FIG. 1. It is preferred that the sides of the opening 4 are at approximately 90° to the polyethylene pipe 10. It is preferred to provide an enlarged portion or undercut portion to the opening 4 just above the polyethylene pipe 10 which allows space for dirt around the pipe or material, such as broken sewer pipe, to be pushed into. Augers or hand equipment may be available to provide an undercut; however, a modification to an auger to carry out this operation will be described hereinafter.

Figure 2:
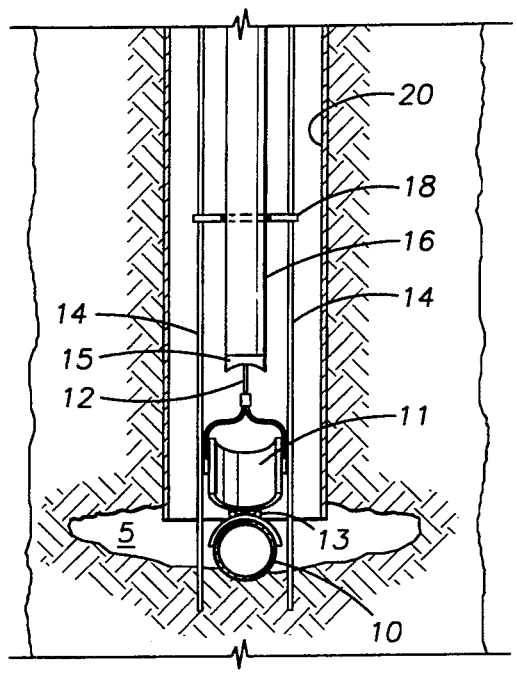

After the excavation or opening 4 is complete to the upper surface of the polyethylene pipe 10, the auger 6 is removed and modified, as will be described in greater detail hereinafter, to create an enlarged portion or undercut portion 5, as illustrated in FIG. 2. The dirt and debris around the exposed portion the polyethylene pipe 10 is moved to fully expose at least one-third ($\frac{1}{3}$) to one-half ($\frac{1}{2}$) of the polyethylene pipe 10, moving the dirt and debris into the enlarged portion or undercut portion 5. This exposed portion of the surface of the polyethylene pipe 10, exposed to the opening 4, is cleaned. A brush or rag on a pole is used to provide a clean surface on the polyethylene pipe 10 for the fusing of service connection to the new pipe. The fusing apparatus which includes a heating element 11 is lowered so as to sit on the surface of the polyethylene pipe 10. The heating element 11 is illustrated as being mechanically moveable from the upright position shown in FIG. 2 to a position on the surface of the polyethylene pipe 10 by a handle 12, operated from the surface. Alternately, a hydraulic system may be used to raise and lower the heating element 11. The heating element 11 sits on a saddle on the polyethylene pipe 10 which includes a hinge 13. The fusing apparatus also includes a supporting structure 14 for a saddle made of polyethylene or the end of a polyethylene pipe 15 which is at the end of a stack 16. The saddle or end of a polyethylene pipe 15 will be fused to the surface of the polyethylene pipe 10. The stack 16, supported and aligned over the polyethylene pipe 10 by sleeves and/or clamps 18 which are connected to and slidable on the supporting structure 14, is lowered into the opening 45. The clamps 18 may be mechanical, such as a cam which is tightened by pulling a lever upwardly at the surface and releasable by pushing the lever down by a rod from the surface. A preferred clamping system is a hydraulic system which will operate the clamps 18 as well as activate the heating element 11, raising or lower as desired. The supporting structure 14 may be four rods on which the sleeves and/or clamps 18 are attached to align the stack 16 on the polyethylene pipe 10 and lower and raise the stack 16, as will be described in more detail hereinafter.

Figure 3:
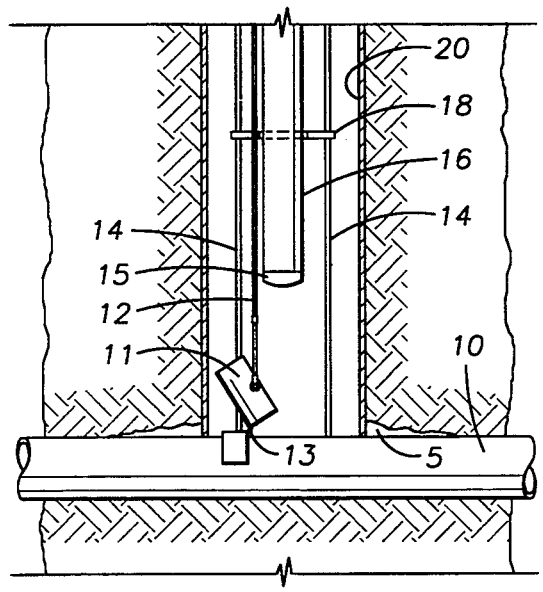

Referring now to FIG. 3, a side view in relation to the polyethylene pipe 10, also illustrates the step of introducing the fusing apparatus which includes the heating element 11 and the supporting structure 14 for the saddle or end of a polyethylene pipe 15 which is to be fused to the polyethylene pipe 10. Also a casing 20 may be introduced into the opening 4, as illustrated in FIG. 3, to prevent any cave-ins or dirt falling on the exposed polyethylene pipe 10 once the top of the pipe has been cleaned and the debris pushed into the undercut 5. A number of apparatus for fusing a stack 16 can be contemplated; however, a preferred embodiment includes the sleeves and/or clamps 18 supported by the four rods which position or align the stack 16 to the exposed surface of the polyethylene pipe 10 and once aligned the supporting structure 14 is made secure. One way to make the supporting structure 14 secure is to drive the rods into the dirt; however, it is also possible to use the exposed surface of the polyethylene pipe 10 such as using a collar on the pipe 10. The only movement desired is the raising and lowering of the stack 16, making certain there is no rotation of the stack 16 once the stack has been aligned.

Figure 4:
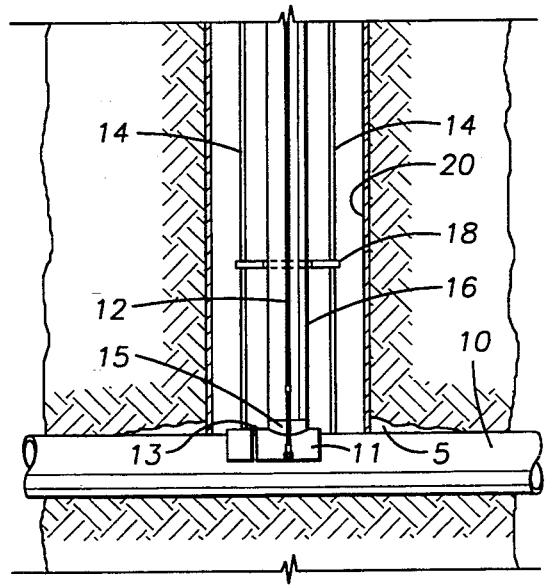
Figure 5:
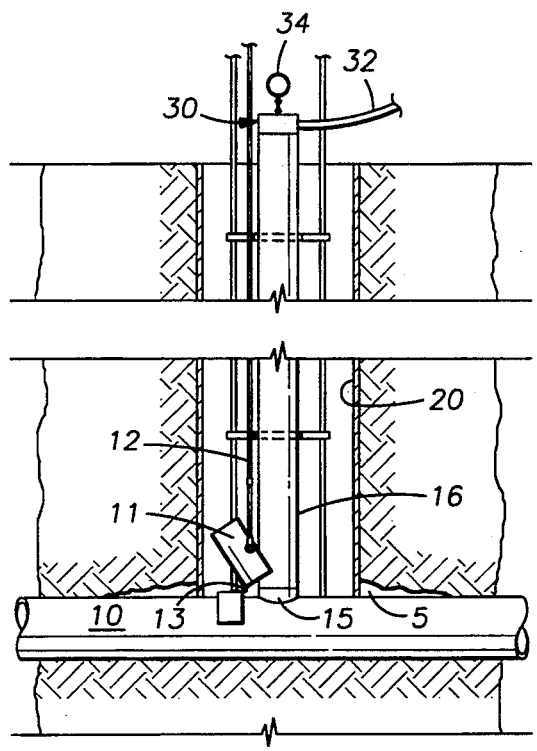
Figure 6:
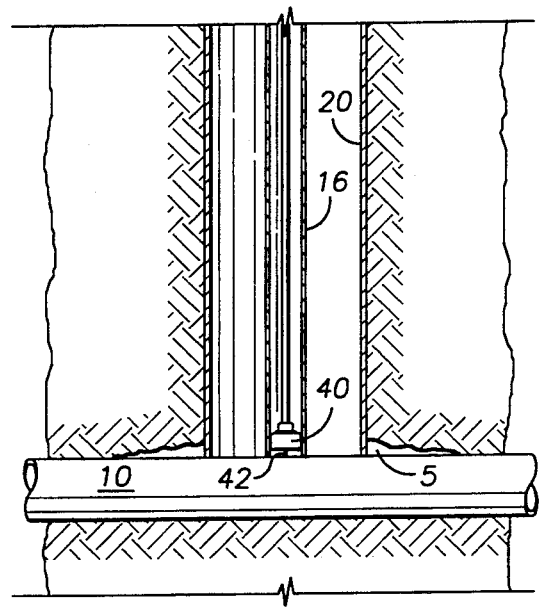

The heating element 11 of the fusing apparatus is lowered as illustrated in FIG. 4 to heat the top surface of the polyethylene pipe 10 and the lower end 15 of the stack 16. The heating surface will have a temperature of about 500° F., the melting temperature of polyethylene. The lower end 15 of the stack 16 is a polyethylene saddle or the end of a polyethylene pipe having a nominal 4" or 6" diameter. If a saddle is used, the stack 16 may be a polymeric material other than polyethylene, such as polyvinylchloride (PVC). It is understood that the materials being fused, i.e. end 15 and pipe 10 are both polyethylene. After heating the top surface of the polyethylene pipe 10 and the lower end 15 of the stack 16 to its molten state, usually less than five minutes, the stack 16 is first raised then the heating element 11 is raised to the positions shown in FIG. 3. The stack 16 is then quickly lowered to contact the top molten surface of the polyethylene pipe 10 where it is held under pressure to fuse the polyethylene end 15 of stack 16 and pipe 10 together, as illustrated in FIG. 5.

After the fusing is complete, which is the cooling of the molten interface between the end 15 of stack 16 and the top of pipe 10, a plug 30 is placed on the top of the stack 16 to test the fuse. Air is introduced into a line 32 to a pressure of between 3 and 10 psi. If the fuse between the stack 16 and the polyethylene pipe 10 is good the pressure will be maintained as indicated by pressure gauge 34. The test need only hold the pressure for a minute or less to test the fuse.

Figure 7:
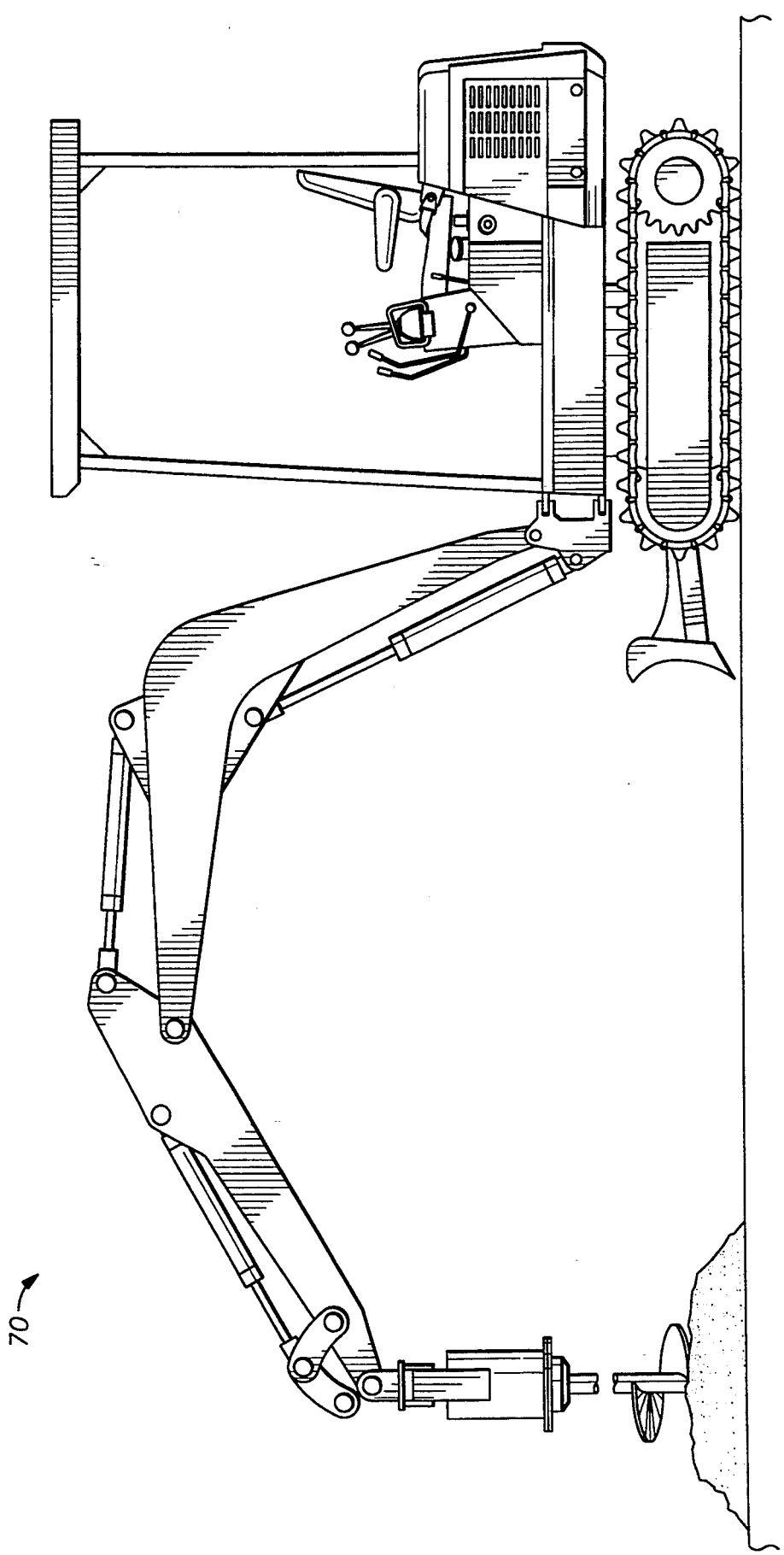
FIG. 7 shows the preferred excavator with auger attached to excavate to the top of the polyethylene pipe.

Only after the fusing of the stack 16 is complete, and preferably tested, is an opening cut into the polyethylene pipe 10. A circular saw 40, having a diameter just less than the internal diameter of the stack 16 so that the saw 40 can rotate and cut a plug from the pipe 10, is introduced through the stack 16 to cut an opening in the polyethylene pipe 10. A screw 42 which extends just below the saw teeth enters the surface and holds the plug cut from the polyethylene pipe 10 and allows the plug to be pulled up with the saw and not dropped into the pipe 10.

referring now to FIGS. 7, the preferred excavator 70 is small enough to be easily placed through a four foot gate in the backyard of a house. The preferred excavator is a Kobota Excavator KX-41 which has a width of less than 42". This machine has the capabilities to use a 15" bucket to locate the service 4 and then power the auger 6. In addition the excavator 70 has power to attach a vacuum or suction system to remove the last amounts of dirt from the top of the polyethylene pipe 10.

Figure 8:
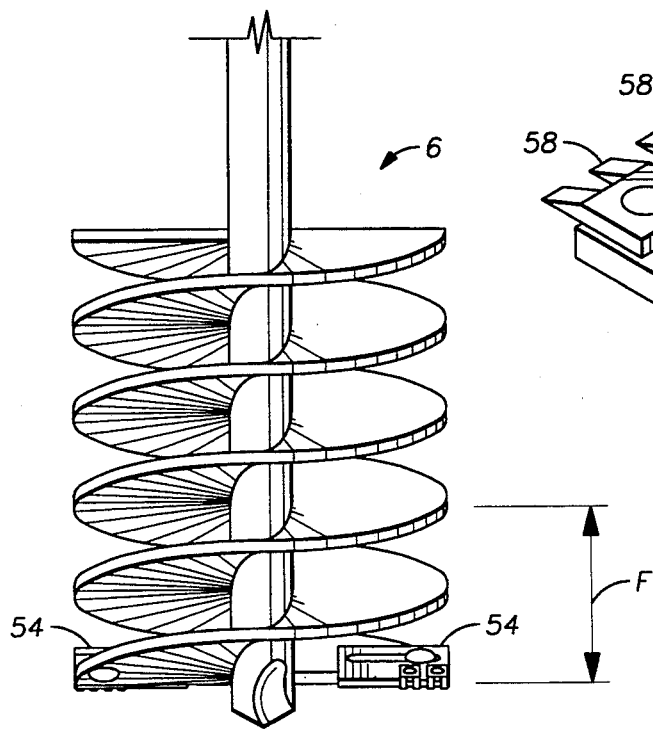
FIG. 8 shows the preferred auger with a modification which undercuts or enlarges the diameter of the opening.
Figure 9:
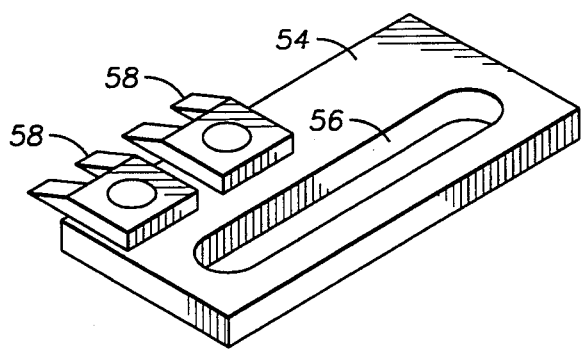
FIG. 9 shows the plate which is attached to the bottom flight of the auger to produce the enlarged diameter and clean the excavation just above the polyethylene pipe.

The preferred auger for the method of the present invention is illustrated in FIG. 8. The auger 6 may have only two to five flights (a flight being one rotation of the helix or "F" as illustrated in FIG. 8) and as shown is preferrably a double helix auger. While this auger will require a number of rotations and removals of the auger in producing the opening 4, the amount of dirt removed is easily handled. The auger 6 is modified when the depth of the opening 4 is within inches above the polyethylene pipe 10. A plate 54, the details shown in FIG. 9, is placed on the bottom surfaces of the lowest flights of the auger 6. The plate 54 is held by a bolt or other attachment device secured to the lower flight of the auger 6 and passing through a slot 56 in each plate 54. Attached to the plate 54 are one or more pair of teeth 58 attached to the cutting edge of the plate 54. As the auger rotates the teeth 58 are caught by the wall of dirt and the plate 54 is pulled outwardly from the auger 6. The rotating plate 54 enlarges the diameter of the opening 4 or provides the undercut portion 5. This attachment may also break up the broken concrete sewer line when used with the slip line method of replacing the polyethylene pipe 10. This attachment is attached to the auger only after the opening 4 has been made to just above the polyethylene pipe 10. The loose dirt which the auger is unable to remove can be removed by a conventional, known suction device (not shown) powered by the excavator 70.

To provide fusing for all the applications where the method of the present invention may be used, a number of sizes or more specifically the surface radius of the heating elements are required. For example, when polyethylene pipe is used in the slip line replacement method, the outer diameter of a SDR21 7" polyethylene pipe is 7.125"; a SDR21 9" polyethylene pipe is 8.625"; and a SDR21 11" polyethylene pipe is 10.750", which are pulled through an 8", 10" and 12" broken line, respectively. On the other hand, if the polyethylene pipe is the result of a break out method of the broken pipe, a SDR17 8" polyethylene pipe (O.D.— 8.625"); a SDR21 10" polyethylene pipe (O.D.—10.750"); or a SDR21 12" polyethylene pipe (O.D.—12.750") will be used. Since the heating element 11 must have the same radius as that of the outer surface of polyethylene pipe 10, more than one heating element is needed; for example, as many as six to handle the different possible polyethylene pipe that will be used. It is understood that only one heating element is used with any polyethylene pipe but that size heating element has the same radius as that polyethylene pipe's outside diameter. The end 15 of the stack 16 whether a saddle or the end of a polyethylene pipe will have the same radius as the polyethylene pipe 10 to which will be fused. For example, a preferred stack is a 4" SDR17 polyethylene pipe which has an outside diameter (O.D.) of 4.5" and an inside diameter (I.D.) of 3.970". The end of the 4" pipe is cut to have the same radius as the polyethylene pipe 10 to which it is fused and the desired length provides the stack 16. To the upper end of the 4" pipe is inserted a common adapter, known as Femco adapter, which connects the 4" pipe to conventional PVC pipe used in service lines. There are conventional lengths, elbows and pieces to complete the connection to the service line. Other 4" polyethylene pipe may be used and stacks may also be made from 6" pipe.

We claim:

1. A method for making a service connection to polyethylene replacement sewer pipe for connection to a service line which comprises:
   (1) locating said service line;
   (2) excavating an opening from the surface to the polyethylene replacement pipe at said service line, said opening being of sufficient size to introduce a heat fusing apparatus;
   (3) introducing the heat fusing apparatus on top of the polyethylene pipe and fusing a stack to the polyethylene pipe; and
   (4) drilling an opening into the polyethylene pipe through the fused stack.

2. A method according to claim 1 which further includes: before drilling the opening into the polyethylene pipe, testing the stack to make certain that there are no leaks in the fusing step and that the stack is securely connected to the polyethylene pipe.

3. A method according to claim 1 which includes the following steps for step (3):
   (3a) introducing a fusing apparatus which includes a heating element and supporting structure;
   (3b) positioning the stack within the supporting structure;
   (3c) positioning the heating element on the polyethylene pipe and the stack on the upper portion of the heating element to heat the upper surface of the polyethylene pipe and the lower end of the stack;
   (3d) raising the stack and then the heating element and quickly lowering the stack onto the heated portion of the polyethylene pipe; and applying pressure to the stack until the fusion of the stack to the polyethylene is complete.

4. A method according to claim 1 wherein said opening excavated in step 2 is less than two feet in diameter.

* * * * *